May 18, 1926.
S. VERNET
WINDSHIELD CLEANER
Filed May 28, 1923   2 Sheets-Sheet 1
1,585,442
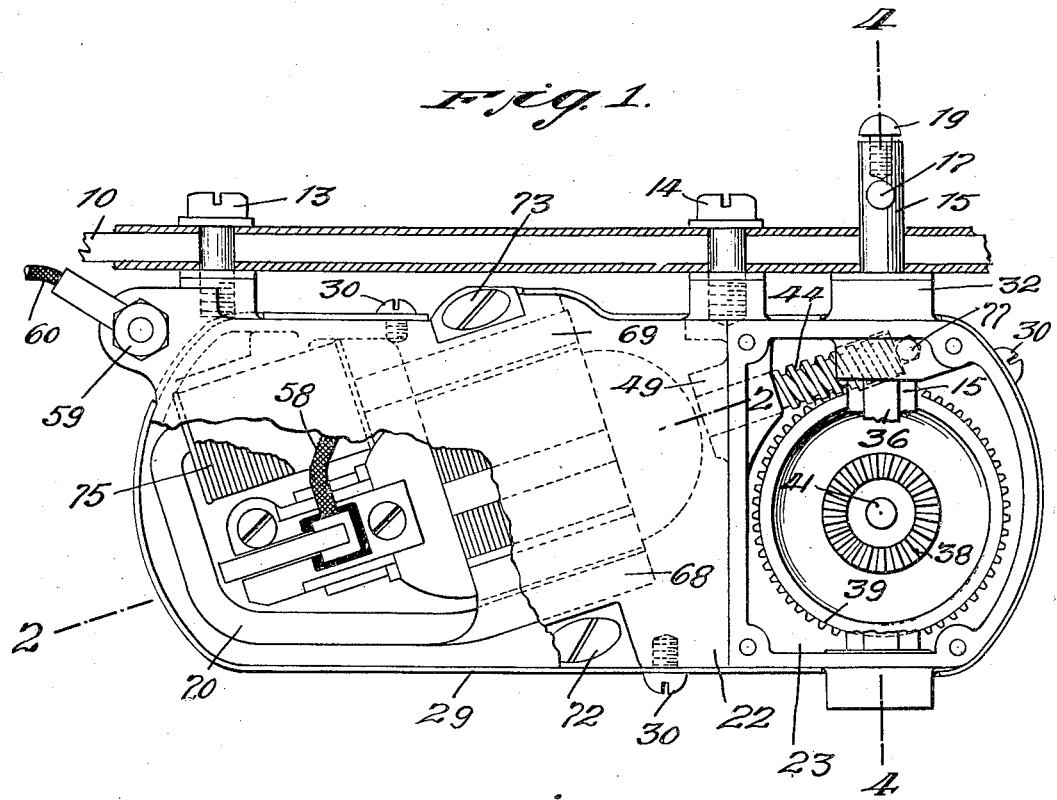
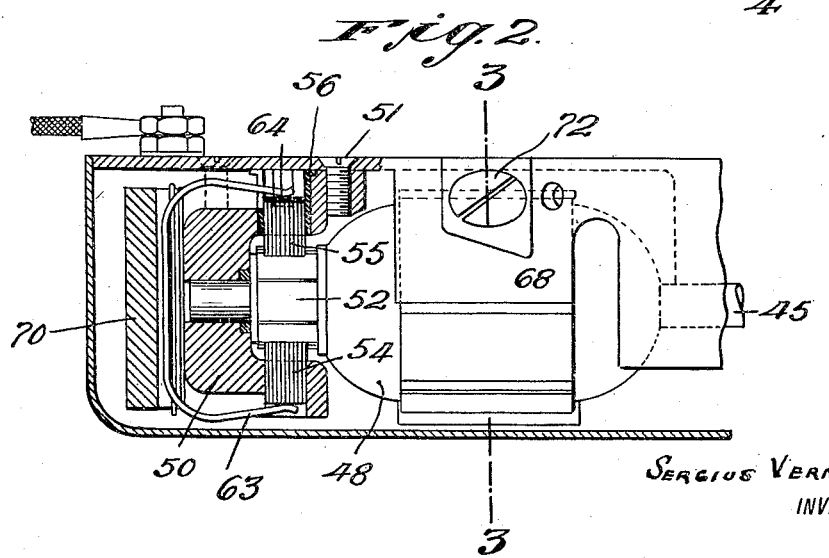
Sergius Vernet
INVENTOR
BY Moses, Hammond & Nolte
ATTORNEYS

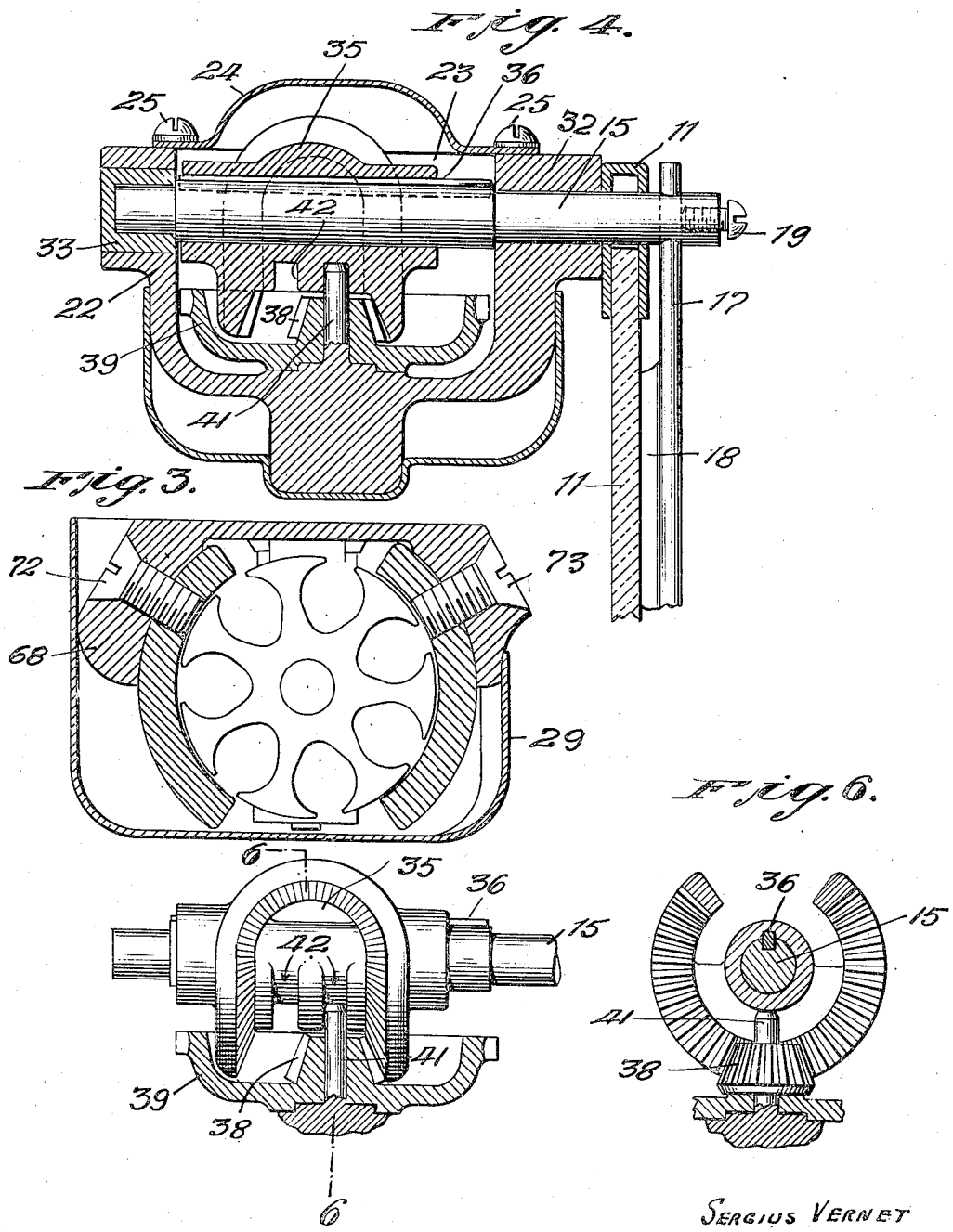

Patented May 18, 1926.

1,585,442

UNITED STATES PATENT OFFICE.

SERGIUS VERNET, OF NEW YORK, N. Y., ASSIGNOR TO MOTORCRAFT ENGINEERING CORPORATION, OF NEW YORK, N. Y.

WINDSHIELD CLEANER.

Application filed May 26, 1923. Serial No. 641,853.

This invention relates to windshield cleaners for automobile and other vehicles, adapted to wipe from the outside of the windshield glass rain and snow which otherwise would obscure the vision of the driver.

The general object of the invention is to provide a new and improved windshield cleaner which is efficient in operation, and is exceedingly compact in form thereby reducing to a minimum the space occupied by the cleaner mechanism.

The invention will be understood from the following description taken in connection with the accompanying drawings, in which Fig. 1 is a plan view, with certain parts broken away or removed, of a windshield cleaner having the invention embodied therein, the device being shown attached to a windshield frame which is illustrated in fragmentary sectional plan; Fig. 2 is a fragmentary vertical section of the device on the plane 2—2 of Fig. 1; Fig. 3 is a sectional elevation in the plane 3—3 of Fig. 2 with the windings omitted; Fig. 4 is a sectional end elevation of the device on the line 4—4 of Fig. 1; Fig. 5 is a fragmentary elevation of certain gearing used for obtaining the oscillatory motion of the wiper shaft; and Fig. 6 is a sectional elevation on the line 6—6 of Fig. 5. Like parts are referred to throughout the various figures by the same reference characters.

Referring to the drawings, the glass 10 of the windshield is shown as mounted in the usual frame 11 of which only a portion of the top side is shown. The windshield cleaner is mounted upon the frame 11, which is drilled so as to receive the mounting screws 13 and 14 by which the cleaner mechanism is clamped to the windshield frame, and so as to allow the wiper shaft 15 to extend from the cleaner mechanism to the outside of the windshield frame. At its outer end, the shaft 15 is drilled so as to receive the wiper arm 17, carrying the usual squeegee adapted to engage the outer surface of the windshield glass 11, said arm 17 being held in rigid engagement with the shaft 15 by means of a set screw 19.

The various parts of the cleaner mechanism are supported in or by the frame 22 which is preferably made of aluminum or other light metal having a low magnetic permeability. The form of the frame 22 will be apparent from the drawings from which it will be seen that said frame at one end is provided with a cavity 23 which forms a gear housing, this cavity being open at the top and adapted to be closed by the cover plate 24, which may be secured to the frame 22 by screws 25. The remainder of the top of the frame 22 is substantially a flat surface, beneath which are mounted the various parts which comprise the electric motor which furnishes, through gearing hereinafter described, power for driving the wiper shaft 15. The parts of the mechanism carried beneath the frame 22 are housed by a removable casing 29, preferably of sheet metal which may be secured to the frame 22 by means of screws 30.

The wiper shaft 15 extends across the cavity 23 and is journaled at one end in a bearing 32 formed in the frame 22, and at the other end in the bushing 33 mounted in the frame 22.

The portion of the shaft 15 in the cavity 23 is preferably of slightly larger diameter than the remainder of the shaft, and mounted upon this larger portion of the shaft is a warped internal bevel gear 35 of the form shown in Figs. 4, 5, and 6. The gear 35 is slidingly arranged on the shaft 15, but said shaft is caused to rotate with it by the key 36 mounted in said shaft and cooperating with a key-way in the hub of the gear 35. Cooperating with the gear 35, is a bevel pinion 38 which is attached to or is integral with the dished worm gear 39. The worm gear 39, and the pinion 38 which is shown as integral with it, are mounted for rotation in the frame 22 which is provided within the cavity 23 with an upwardly extending pin 41 projecting through an axial hole in the worm gear and pinion and a short distance beyond the upper face of said gear. The upper end of the pin 41, which is preferably beveled as shown, cooperates with channels 42 arranged as shown on one side of the hub of the gear 35 between the gear faces thereof. The pin 41 serves, in a manner hereinafter described, as a guide pin to hold the pinion 38 and the gear 35 in proper cooperative relation during certain portions of their movement with reference to one another. The worm gear 39 is driven by a worm 44 on the shaft 45 of the driving motor which will presently be described. The comparatively high speed of the electric motor is thus reduced by the worm 44, the worm gear 39, pinion 38 and gear 35, so that the shaft 15 is rotated at very slow speeds in comparison to the speed of the motor. It will be obvious that the effect of the gear 35 will be to cause the shaft 15 to be rotated first in one direction and then in the other, through an angle which will be somewhat less than 180°. When the gear 35 is near each end of its angular movement, said gear will be moved longitudinally on the shaft 15, with the result that the guide pin 41 will engage first one and then the other of the slots 42.

The driving motor for the windshield cleaner will now be described. This motor is believed to be novel in construction and to be particularly well adapted for the use to which it is put. The shaft 45 which carries the armature 48 of the motor is journaled in a bearing 49 in the frame 22, and in a bearing 50 which also serves as a support for the motor brushes and is attached to the frame 22 by the screws 51 or in any other suitable manner. The armature 48 is provided with a commutator 52 with which brushes 54 and 55 cooperate. As shown, brush 54 is mounted directly in the bearing 50 which is grounded; and the brush 55 is electrically insulated from the bearing 50 by means of a sleeve 56 of insulating material which lines the cavity in the bearing 50 in which said brush is located. The brush 55 is electrically connected by an insulated wire 58 to the binding post 59 to which the wire 60 furnishing current to the motor may be attached. The brushes 54 and 55 are yieldingly held in engagement with the commutator 52 by means of a U shaped spring 60, one end of which engages the brush 54 while the other end cooperates with the disc 64 of insulating material which rests on the outer end of the brush 55. The pole pieces 68 and 69 of the motor are preferably integral with the field magnet frame 70 which extends around the bearing 50 in the manner shown in Figs. 1 and 2. The pole pieces 68 and 69 are attached by screws 72 and 73 to the frame 22, thereby firmly supporting said pole pieces in proper relation to the armature 48. The field windings 75 of the motor are located upon a portion of the field frame 70, adjacent the bearing 50 and the commutator 52; and said field windings are properly connected in the motor circuit by wires which are not illustrated. The worm 44 and the worm gear 39 are so pitched that during operation of the cleaner mechanism the longitudinal thrust of the shaft 45 will be toward the right as viewed in Fig. 1; and this thrust is taken by a steel ball 77 arranged within a cavity in the frame 22.

It will be apparent that by arranging the shaft of the motor inclined to the plane of the windshield as shown, it becomes possible to arrange the armature and field structures of the motor in an exceedingly small space. This permits the dimensions of the cleaner mechanism to be reduced to a minimum, a result which is highly desirable in a device of the character of the one to which the present invention refers.

While I have described one form in which my invention may be embodied, it is to be understood that this is merely illustrative, and that many modifications may be made without departing from the spirit of the invention as defined in the appended claims.

What I claim is:

1. In a mechanism for operating a windshield wiper, a substantially rectangular frame, a rock shaft journaled in said frame, an electric motor having the axis of its armature inclined to the sides of the frame to enable the size of the frame to be reduced, a worm on said motor shaft, a worm wheel journaled in said frame and cooperating with said worm, and operative connection between said worm wheel and said rock shaft whereby rotation of said worm wheel causes oscillatory rotation of said rock shaft.

2. In a mechanism for operating a windshield wiper, a substantially rectangular frame, a rock shaft journaled in said frame, an electric motor having the axis of its armature and shaft disposed diagonally of said frame to enable a minimum size of frame to be used, a worm on said motor shaft, a worm wheel journaled in said frame and cooperating with said worm, and an operative connection between said worm wheel and said rock shaft whereby rotation of the worm wheel causes oscillatory rotation of said rock shaft.

3. In a mechanism for operating a windshield wiper, a frame, a rock shaft journaled in said frame, an electric motor having the axis of its armature and shaft disposed diagonally of said frame, a worm on said motor shaft, a worm wheel journaled in said frame and arranged for rotation on an axis substantially in the same plane and perpendicular to the axis of the rock shaft, and an operative connection between said worm wheel and said rock shaft whereby rotation of the worm wheel causes oscillatory rotation of said rock shaft.

4. In a mechanism for operating a windshield wiper, a frame having at one of its ends a cavity forming a gear housing, the remainder of the top of the frame being a substantially flat surface, a rock shaft extending across said cavity and journaled in said frame, an electric motor with the axis of its shaft and armature substantially diagonal of said frame supported by and journaled in said frame and located beneath the flat top surface thereof, gearing located in said cavity and operatively connecting said motor and said wiper shaft whereby the latter is driven by the motor with oscillatory rotation.

5. In a mechanism for operating a windshield wiper, a frame, means for securing said frame to a windshield, a rock shaft journaled in said frame, an electric motor having the axis of its armature disposed diagonally of said frame, said motor having a substantially U-shaped field frame extending around one end of said motor, field windings located on said field frame adjacent one end of said motor, and an operative connection between said motor and said rock shaft whereby said motor drives said rock shaft with oscillatory rotation.

6. In a mechanism for operating a windshield wiper, or the like, the combination of a frame, a motor, having the axis of its armature and shaft substantially diagonal of said frame, to enable a minimum size frame to be used, a rock shaft journaled in the frame, and mechanism between the motor shaft and the rock shaft for driving the rock shaft from the motor.

7. In a mechanism for operating a windshield wiper or the like, the combination of a rock shaft, means on the rock shaft for securing a windshield wiper thereto, a warped internal bevel gear, mounted to turn with the shaft and capable of relative longitudinal movement thereon, a constantly rotating bevel pinion for driving the gear in alternately reverse direction a worm wheel connected to the pinion and means for driving the worm wheel.

8. In a mechanism for operating a windshield wiper, the combination of a rock shaft, a warped internal gear, mounted to turn with the shaft and capable of relative longitudinal movement thereon, a constantly rotating pinion on a fixed shaft for driving the gear in an alternately reverse direction, a dished worm wheel connected to the pinion, and means for driving the worm wheel.

9. In a mechanism for operating a windshield wiper, a substantially rectangular frame, the combination of a rock shaft journaled in said frame, means on the rock shaft for securing a windshield wiper thereto, a warped reversing gear mounted to turn with the shaft and capable of relative longitudinal movement thereon, a constantly rotating pinion, for driving the gear in alternately reverse directions, a wormwheel connected to drive the pinion and a motor with the axis of its armature and shaft substantially diagonal of said frame, for driving the wormwheel.

10. In a mechanism for operating a windshield wiper or the like, the combination of a frame, a motor having the axis of its armature and shaft substantially diagonal of the frame, a worm on the shaft, a dished worm wheel driven thereby, a bevel pinion in the dished worm wheel, and connected to turn therewith, a warped reversing gear depending into the dished worm wheel and meshing with the pinion and a rock shaft operated by said reversing gear.

11. In a mechanism for operating a windshield wiper, a rock shaft, a warped gear adapted to impart rotational movement to the rock shaft but capable of longitudinal movement thereon, a dished worm gear and a central pinion in said dished portion meshing with the warped gear to drive the same in alternatively reverse direction and means to drive the worm gear and pinion.

12. In a mechanism for operating a windshield wiper or the like, the combination of a substantially rectangular frame, a motor having the axis of its armature and shaft substantially diagonal of said frame, a field piece arranged to co-operate with said armature, field windings located on said field piece and arranged within the triangular spaces formed between the diagonal shaft and the frame, a worm on said motor shaft, a dished worm wheel driven thereby, a bevel pinion in the dished wormwheel and connected to turn therewith, a warped reversing gear depending into the dished worm wheel and meshing with the pinion and a rock shaft operated by said reversing gear.

13. A windshield cleaner comprising a substantially rectangular housing, a worm wheel placed in one end of said housing, a motor the armature of which is arranged diagonally within said housing in substantially the same plane as the worm wheel, a wiper operating means, and operative means connecting the worm wheel with the wiper operating means.

14. A windshield cleaner comprising an oscillating wiper supporting shaft, means for oscillating said shaft comprising a casing adapted to be attached to the frame of the windshield with the wiper supporting shaft projecting thru said frame and at right angles thereto, an electric motor supported in said casing with its shaft at an angle to said windshield frame and to said oscillating shaft and gearing in said casing for transforming the rotary motion of said motor shaft into an oscillating motion and transmitting it to said oscillating shaft, said gearing comprising a worm on said motor shaft and a worm wheel driven by said shaft of a diameter substantially equal to the cross sectional dimension of the casing.

15. In an automatic windshield cleaner, the combination of a casing adapted to be attached to the frame of the windshield, said casing having a motor compartment and a gear compartment, a motor mounted in said motor compartment with its shaft at an angle to the frame of the windshield and projecting thru a bearing in the wall of the casing between said compartments and at a point adjacent the side wall of the casing, a gear in said gear compartment having driving engagement with said shaft, a wiper operating shaft projecting from said gear compartment, and means in said compartment between said gear and said shaft for producing an oscillating motion of said shaft.

16. In an automatic windshield cleaner, the combination of a casing adapted to be attached to the frame of the windshield, a motor in said casing with its shaft extending at an angle to the frame of the windshield, a wiper for the windshield, means for oscillating said wiper from said motor shaft, said motor having its field coil offset longitudinally of its armature with the adjacent portion of said coil closer to the said motor shaft than the periphery of said armature.

Signed at New York, N. Y., this 24th day of May, 1923.

SERGIUS VERNET.